Aug. 24, 1943.  C. F. SALTZ  2,327,608
BALANCING ROTATING ELEMENT
Original Filed March 5, 1941

INVENTOR.
CLARE F. SALTZ
BY
HIS ATTORNEY

Patented Aug. 24, 1943

2,327,608

UNITED STATES PATENT OFFICE 2,327,608

BALANCING ROTATING ELEMENT

Clare F. Saltz, Ypsilanti, Mich.

Original application March 5, 1941, Serial No. 381,849. Divided and this application February 9, 1942, Serial No. 430,009

4 Claims. (Cl. 51—103)

My invention pertains to an improved method of and means for preparing rotating elements of metal or other material for balanced rotation, and this application is a division of my co-pending application, Serial No. 381,849 filed March 5, 1941.

In the production of rotatable machine parts such as flywheels, crank shafts, and the like, it is very important to provide a uniform distribution of the mass around the axis of rotation in order to obtain a balance as nearly perfect as possible in the rotating element. This is especially important in the production of parts to be rotated at high speeds. As is well known, unbalanced machine parts rotating at high speed in fixed bearings absorb a large amount of energy and also cause wear and vibration. Also, when the unbalance is considerable, it is sometimes necessary to change the operating speed to some other speed less suitable for the operation desired. Such unbalance exists when the center of gravity of the rotating part does not coincide with the axis of rotation. But the careful balancing of such parts requires the expenditure of considerable skill and time which adds greatly to the cost of production of such elements.

It has been customary to carefully test the element to determine on which side of the axis it is overbalanced and the magnitude thereof. An attempt is then generally made to remove or to add sufficient metal at a proper location on the element to balance it. This is usually done by a cut-and-try method successively testing the part and removing metal therefrom. I am also aware that various arrangements have been previously provided for automatically removing metal from such an element to balance it in an attempt to simplify this difficult and costly operation.

In accordance with my present invention, material is not removed from the element for the purpose of balancing but instead the element is prepared for balanced rotation by removing only sufficient material to form bearing surfaces so located on the element that when the element is mounted to rotate thereon it is balanced to the desired degree of perfection.

It is accordingly an object of my invention to provide an improved method of and means for balancing a rotating element by removing from the element, while it is rotating, only sufficient metal to form the bearing surfaces for balanced rotation.

It is also an object of my invention to provide an improved method of and means for balancing a rotating element by mounting for free spinning rotation the element to be balanced, rotating the element at a speed sufficient to cause it to select its axis of rotation and describe a surface of revolution, and then forming bearing surfaces on the portions of the element which are to be journalled by removing metal therefrom at the points of coincidence of the actual surface of the element with the surface of revolution so that bearing surfaces are formed concentric with the self-selected axis of rotation of the rotating element, eliminating the necessity for balancing the element.

Also it is a further object of my invention to provide improved apparatus for balancing a rotating element, in accordance with my improved method, comprising free bearing means for rotatively supporting the lower portion of the element and means for applying driving torque to rotate the element and keep it spinning, while metal removing means engages it.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing specific embodiments of my invention, similar reference characters being applied to corresponding elements throughout, and in which.

Figure 1:
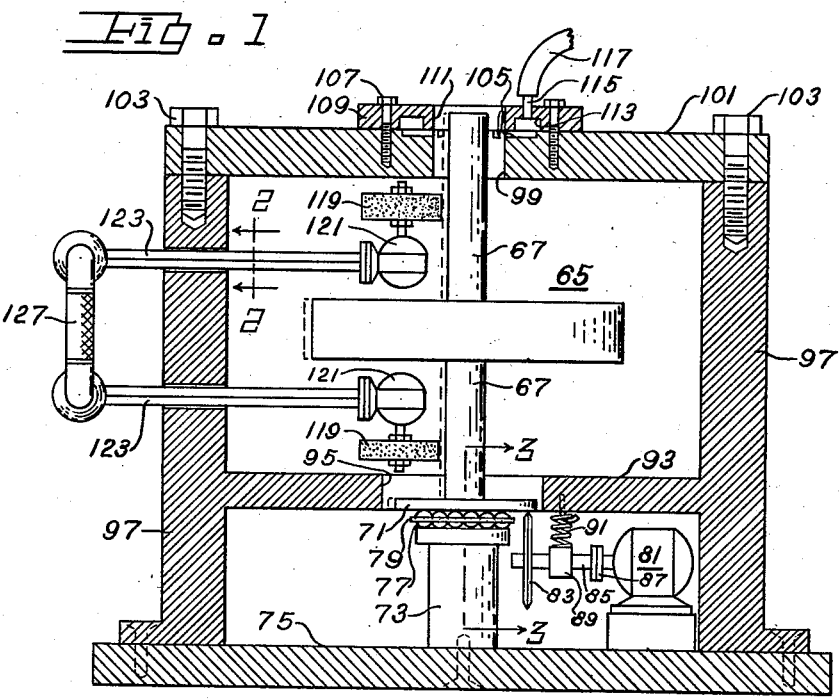
Fig. 1 is a side elevational view, partially sectioned, showing my apparatus for preparing a rotating element for balanced rotation.
Figure 3:
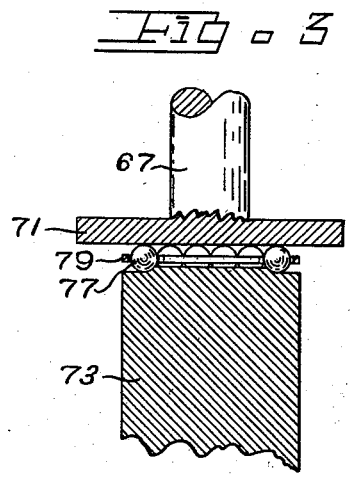
Fig. 3 is an enlarged fragmentary sectional view on line 3—3 of Fig. 1, showing the free bearing support.

Referring more specifically to Fig. 1 of the drawing, I have illustratively disclosed an embodiment of my apparatus arranged for preparing for balanced rotation a work piece or element 65 which may consist of a shaft 67 having a flywheel 69 secured thereon and having a flange 71 projecting laterally from the lower end for some such purpose as attachment to a machine, or for limiting the axial movement of the shaft after the element has been journalled in its ultimate installation. Although this particular element is shown by way of example, it is to be understood that the element to be balanced may take various other forms, such as a rotor for electrical apparatus or a rotor for a turbine, for example.

The apparatus comprises a bearing standard 73 rising from a base 75 whereon the apparatus is constructed or assembled. The lower end of the element 65 rests and spins freely upon the upper end of the bearing standard 73 and, to provide a free bearing support, friction reducing ball bearings 77 are preferably provided thereon to reduce the friction to a minimum. The friction-reducing balls are confined in a ball-retainer cage 79, in a well-known arrangement, there being several ball-bearing assemblies on the market which are suitable for this purpose.

To spin the element so that it will select a centroidal axis about which balanced rotation will be obtained, any suitable source of power may be utilized, such as an electric motor 81 having suitable speed adjustable characteristics. The motor is mounted on the base 75, and to apply driving torque to the lower end of the vertically disposed element shaft 67, a friction drive wheel 83 is provided. This friction drive wheel 83 is secured on a horizontally disposed shaft 85 which is secured to the extended end of the motor shaft through a flexible coupling 87 which may be of any well-known construction. The friction drive wheel 83 is maintained in positive engagement with the flange of the element by means of a floating bearing 89 thereon drawn upwardly by a spring 91 suspended from a structural member 93. The friction drive wheel 83 is preferably provided with a periphery which is either rounded or bevelled to present a minimum localized contact area engaging the lower end of the element.

Flange 71 on the lower end of the shaft 67 is enclosed in a guide aperture 95 in the structural member 93, the latter being horizontally supported between a pair of vertical side members 95, which may be either spaced brackets in a substantially H formation or side walls of a cylindrical housing. The guide aperture 95 is of a substantially larger diameter than the circular flange disk 71 and serves to approximately predetermine the position of the lower end of the shaft 67 on the free bearing standard 73 while permitting it to rotate freely to select its own centroidal axis of rotation for balanced rotation.

The upper end of the shaft 67 of the element is also similarly confined within predetermined limits in a guide aperture 99 in a horizontal top bracket 101. The top bracket 101 is secured horizontally across the top of the side members 97 as by screws 103 in the ends of these members. The guide aperture 99 is of a larger diameter than the shaft 67 to permit it to move freely therein.

Direct engagement or striking between the shaft 67 and the side walls of the apertures is preferably prevented by projecting streams of air or other fluid thereinto from all sides. This is conveniently provided for as by cutting in the top surface of the top bracket 101 a plurality of slots 105 extending radially and opening through the side walls toward the center of the aperture 99. Clamped firmly on top of the top bracket 101 by means of screws 107 is a manifold plate or ring 109 of an annular conformation having a central aperture 111 in alignment with the guide aperture 99. An annular fluid conducting inlet passage 113 in the under side of the manifold plate 109 connects with all the radial slots 105 and supplies the air or other fluid thereto from any suitable pressure source, to which it may be connected through a nipple 115 and hose 117. A tight-sealed joint may be conveniently provided between the manifold ring 109 and the top bracket 101 by inserting any suitable gasket material therebetween, as will be understood.

When the upper end of the shaft 67 of the spinning element approaches the side wall of the guide aperture 99 in any direction, the cylindrical peripheral surface of the shaft closely approaches the side wall of the aperture tending to confine or restrict the jets of fluid from an adjacent one of the slots 105 and this applies a force gently guiding the shaft away from the side wall of the aperture. If the shape of the work pieces makes it desirable, the lower guide aperture 95 may also be similarly provided with slots for projecting fluid toward the rotating element, although this may be omitted when the lower end of the motor driven work piece has a flange 71, as shown.

As the unbalanced element spins, it rotates on its self-selected centroidal axis about which balanced rotation is obtained, and it describes a surface of revolution larger in diameter than the shaft, in accordance with the amount of unbalanced mass in the element.

All masses under rotation seek to revolve upon an axis passing through the center of mass of the element, but with an unbalanced member rotating on fixed bearings this condition is not attainable so that the state of unbalance continues, causing vibration, power loss and wear. In accordance with my invention the element being prepared for balanced rotation is free to shift and select its own axis of rotation, which it does, and the element then rotates on an axis passing through the center of gravity. This self-selected axis of rotation, which I have termed the centroidal axis, is displaced from the geometrical axis by an amount corresponding to the amount of unbalanced mass in the body being balanced, as more fully described in my copending parent patent application.

In Fig. 1, the element is shown in full lines in its extreme right-hand position and a dotted line represents its extreme left-hand position. New bearing surfaces are cut simultaneously upon all portions of the shaft which are to be journalled. This is accomplished by approaching the shaft 67 with any suitable metal removing devices, such as rotating grinding wheels 119 supported and driven by electric motors 121 mounted on the ends of bars 123 which slide through apertures 125 in the side member 97.

Figure 2:
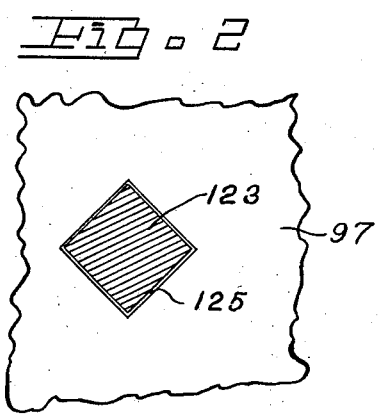
Fig. 2 is an enlarged fragmentary sectional view taken on line 2—2 in Fig. 1, showing how the brackets of the motorized grinders are slidably mounted.

The sliding motor-supporting bars 123 and the apertures 125 are of a square, or other non-circular cross section, as shown in Fig. 2, so that the shafts of the motors are maintained disposed in suitable vertical or predetermined positions while being moved toward or away from the rotating element. A handle 127 may be provided connected to the two slidable brackets 123 for conveniently moving both of the grinding wheels 119 against the work. As the grinding wheels 119 are at first moved into engagement with the shaft 67, a brief contact is established once during each revolution. As the metal is cut away to form the new bearing surfaces, the period of contact between the grinding wheels and the shaft becomes longer until finally a smooth but light contact is maintained during the entire rotation. This informs the operator that the operation is completed and that new bearing surfaces have been cut which are concentric with the centroidal axis. Bearing surfaces of any desired length may be cut by selecting grinding wheels 119 of a corresponding axial dimension. Various elements, or work pieces, may be balanced in accordance with the principles of my invention whether these are made of metal, plastic compositions or other materials. The gyroscopic action of the rapidly rotating element resists tilting deflection by engagement with the cutting or grinding wheel, and translation is resisted and limited by the stationary guide aperture or the projected fluid jets. Also the grinding wheels exert but very slight retarding forces on the rotating element or these wheels may actually be rotated in the same direction but at a higher speed.

It is apparent that within the scope of the invention, modifications and different arrangements may be made other than herein disclosed, and the present disclosure is illustrative merely, the invention comprehending variations thereof.

I claim:

1. Apparatus for preparing a rotating work element for balanced rotation having in combination, a free bearing for supporting the lower end of an element while spinning in a vertical position, driving means for rotating the element spinning freely upon said free-bearing, guide means for limiting the free movement of said element so that its position will be within a predetermined range while it rotates upon a self-selected axis, and adjustable metal-removing means for engaging the portions of said freely spinning element to be journalled to form bearing surfaces thereon concentric with the self-selected axis of rotation while the element is spinning.

2. Apparatus for preparing a rotating work piece for balanced rotation having in combination, free bearing means for supporting the lower end of the work piece while spinning in a vertical position, means for rotating the work piece spinning freely upon said free bearing means, guide means for softly limiting the free movement of said work piece within a predetermined range while it rotates freely upon a self-selected axis, a support member, bracket means slidably mounting said support member substantially horizontally with one end extending toward the position of a free spinning work piece, a cutting wheel and means for rotatively supporting and driving said wheel on said support member for movement toward or away from a work piece spinning on said free bearing means.

3. Apparatus for preparing a rotating work element for balanced rotation having in combination, a substantially closed housing disposed vertically, a free bearing disposed substantially axially at the lower end of said housing for supporting the lower end of a work element while spinning in a vertical position, driving means for rotating the element spinning freely upon said free bearing, guide means supported from said housing for softly guiding the free movements of said element so that its position will be within a predetermined range while it rotates freely upon a self-selected axis, and metal-removing means adjustably supported from said housing for engaging the portions of the freely spinning element to be journalled to form bearing surfaces thereon concentric with the self-selected axis of rotation.

4. Apparatus for preparing a rotating element for balanced rotation having in combination, free bearing means for supporting the lower end of an element while spinning in a vertical position, vertical support means spaced on opposite sides of said bearing means, means for rotating the element spinning freely upon said free bearing means, fluid projecting means supported from said vertical support means and disposed to project fluid for softly guiding the free movement of said element so that its position will be within a predetermined range while it rotates freely upon a self-selected axis, a support member mounted slidably in said vertical support means in a substantially horizontal position with one end extending inwardly toward the position of a free spinning element, a cutting wheel, and means for rotatively supporting and driving said wheel mounted on the inwardly extending end of said support member for movement toward or away from a freely spinning element to form bearing surfaces thereon.

CLARE F. SALTZ.